2,969,372

CYCLOALKYLPYRAZOLO[3,4-a]INDEN-4[1H]-ONE DERIVATIVES

Robert A. Braun and William A. Mosher, Newark, Del. (Both of 1530 Spring Garden St., Philadelphia, Pa.)

No Drawing. Filed Oct. 1, 1959, Ser. No. 843,657

11 Claims. (Cl. 260—310)

This invention relates to a novel series of cycloalkylpyrazolo[3,4-a]inden-4(1H)-one, hydrazone derivatives which have useful pharmacodynamic activity in the animal organism. This invention also relates to the novel cycloalkylpyrazolo[3,4-a]inden-4(1H)-one derivatives of use as intermediates in the preparation of the hydrazones of this invention.

More specifically, this invention relates to 3-cycloalkylpyrazolo[3,4-a]inden-4(1H)-one, hydrazones having utility as central nervous system depressants, anti-Parkinson agents and hypotensive agents, in particular as tranquilizers and ataractics. The novel 3-cycloalkylpyrazolo-[3,4-a]inden-4(1H)-one intermediates also have utility as mild sedative and tranquilizing agents and as antibacterial agents particularly against gram-positive organisms.

This novel series of compounds is represented by the following structural formula:

FORMULA I

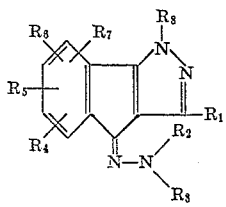

when:

$R_1$ represents cycloalkyl, methylcycloalkyl, or ethylcycloalkyl having 3 to 6 carbon atoms in the cycloalkyl moiety, cycloalkenyl, methylcycloalkenyl or ethylcycloalkenyl having 4 to 6 carbon atoms in the cycloalkenyl moiety;

$R_2$ and $R_3$ represent hydrogen, lower alkyl or, when taken together with the nitrogen to which they are attached, monophenylamino;

$R_4$, $R_5$, $R_6$ and $R_7$ represent hydrogen, hydroxy, lower alkyl, amino, halogen, lower alkoxy or nitro; and $R_8$ represents hydrogen, lower alkyl, aralkyl having 7 to 8 carbon atoms such as benzyl or phenethyl, or acyl of less than 9 carbon atoms such as benzene-sulfonyl, benzoyl, lower alkanoyl, for instance acetyl or propionyl, or lower alkyloxycarbonyl such as carbethoxy or carbomethoxy.

Preferred compounds of this invention are represented by the following structural formula:

FORMULA II

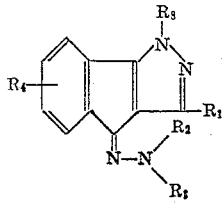

when:

$R_4$ represents hydrogen or chloro and, $R_1$, $R_2$, $R_3$ and $R_8$ are as defined in Formula I.

Preferred and advantageous compounds of this invention are those of Formula I in which $R_1$ is cycloalkyl having 3 to 6 carbon atoms, $R_2$ and $R_3$ are hydrogen or methyl and $R_{4-8}$ are hydrogen. The compound in which $R_1$ is cyclopropyl and $R_{2-8}$ are hydrogen is of particular advantage as a tranquilizer.

The terms "lower alkyl," "lower alkanoyl" or "lower alkoxy" where used herein indicate moieties with not more than 4 carbon atoms, preferably methyl or ethyl radicals.

Whenever basic or acidic producing moieties are present in the compounds of this invention the corresponding nontoxic, chemically stable and pharmaceutically acceptable salts are included in this invention such as the acid addition salts of an amino substituent.

The 3-cycloalkylpyrazolo[3,4-a]inden-4(1H)-one derivatives of this invention are prepared most advantageously from 2-cycloalkylcarbonyl-1,3-indandiones by reaction with various molar equivalents of hydrazine. For instance, reaction of 2-cycloalkylcarbonyl-1,3-indandiones with one molar equivalent of hydrazine yields novel 3-cycloalkylpyrazolo[3,4-a]-inden-4(1H)-one intermediates of the following structure:

FORMULA III

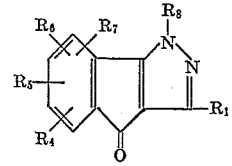

in which $R_1$, $R_4$, $R_5$, $R_6$ and $R_7$ are as defined for Formula I and $R_8$ is hydrogen. Particularly preferred compounds are those where $R_1$ is cycloalkyl having 3 to 6 carbon atoms and $R_4$–$R_8$ are hydrogen.

For instance, substantially equivalent molar quantities of the 2-cycloalkylcarbonyl-1,3-indandione and hydrazine are reacted at elevated temperatures, such as from about 40° C. to 130° C., for a reaction period of from about 30 minutes to 24 hours in a suitable solvent in which the reactants are substantially soluble and with which no chemical reaction occurs. Normally, the solvent is a polar organic solvent such as the preferred lower alcohols especially methanol and ethanol or mixtures thereof. Alternatively, however, benzene, tetrahydrofuran, toluene, xylene and other such solvents can be used. The hydrazine reactant may be either as the hydrate or the pure hydrazine.

In many cases small amounts of hydrazone impurities are formed as byproducts. The reaction mixture is usually worked up by diluting the mixture with water, separating the resulting solid and fractionally crystallizing to give the 3-cycloalkylpyrazolo[3,4-a]inden-4(1H)-one intermediates.

The compounds in which $R_8$ is lower alkyl, aralkyl or acyl are preferably prepared by reacting the pyrazolo[3,4-a]inden-4(1H)-one intermediates with a basic reagent, preferably an alkali metal or its hydroxide, amide, carbonate or, advantageously, hydride, to form the N-metal salt, for instance the preferred sodium, potassium or lithium derivative at the 1-position. This N-metal derivative is then reacted with a reactive alkyl, aralkyl or acyl halide to give the 1-substituted-3-cycloalkylpyrazolo [3,4-a]inden-4(1H)-one compounds of Formula III in which $R_8$ is defined as in Formula I, said compounds being a part of this invention.

The novel end product hydrazones of this invention represented by Formula I are prepared by reacting the intermediate ketones of Formula II (including $R_8$ as substituted or unsubstituted) with hydrazine, either about one molar equivalent or an excess, at from 30 minutes to 72 hours under reaction conditions much like those described hereabove for the formation of the pyrazoloindenones. Methanol or ethanol are especially preferred solvents for this reaction. This two-step reaction is necessary for compounds in which $R_2$, $R_3$ and $R_8$ are substituents other than hydrogen. Other compounds are preferably prepared by reacting the 2-cycloalkylcarbonyl-1,3-indandione with either about two moles or an excess of hydrazine under reaction conditions similar to those under which the pyrazoloindenones are formed to give the desired 4-hydrazone end products directly. This method is preferred. In these reactions an excess of hydrazine can be used but has little advantage. Also the reaction time can be extended considerably but once again with little advantage.

The 2-cycloalkylcarbonyl-1,3-indandione starting materials are either known to the art or are prepared by synthetic methods similar to those known. For instance a cycloalkyl methyl ketone is condensed with a dimethyl or diethyl phthalate in an aromatic solvent such as benzene or toluene with an alkaline condensing agent such as sodium methoxide, sodium ethoxide, sodium hydride, or sodium hydroxide.

It will be apparent to one skilled in the art that many variations of this invention can be practiced. The following examples are designed to teach fully the preparation of the compounds of this invention and are not meant to limit the scope of this invention.

*Example 1*

To a mixture of 97 g. of dimethylphthalate, 150 ml. of ligroin and 70 ml. of toluene is added 28.5 g. of sodium methoxide. A solution of 42 g. of cyclopropyl methyl ketone in 66 ml. of ligroin and 33 ml. of toluene is added dropwise while azeotropically separating methanol. The mixture is cooled and the solid sodium salt is separated. Dissolving the sodium salt in water, acidifying with concentrated hydrochloric acid and filtering and recrystallizing the solid from aqueous ethanol gives 2-cyclopropylcarbonyl-1,3-indandione, M.P. 130–132° C.

A mixture of 21.4 g. of the indandione, 5.0 g. of hydrazine hydrate and 250 ml. of ethanol is refluxed for 24 hours. Cooling, adding water, filtering and recrystallizing the resulting solid from aqueous ethanol gives 3-cyclopropylpyrazolo[3,4-a]inden-4(1H)-one, M.P. 212–219° C.

A mixture of 21.4 g. of 2-cyclopropylcarbonyl-1,3-indandione, 8.5 g. of 85% hydrazine and 200 ml. of ethanol is refluxed for 48 hours. Cooling separates the desired 3-cyclopropylpyrazolo[3,4-a]inden-4(1H)-one, hydrazone, M.P. 247–251° C.

*Example 2*

A mixture of 2.1 g. of 3-cyclopropylpyrazolo[3,4-a]inden-4(1H)-one, prepared as in Example 1, is refluxed with 0.5 g. of methylhydrazine in 50 ml. of ethanol for 10 hours. Cooling and filtering the reaction mixture gives 3 - cyclopropylpyrazolo[3,4 - a] - inden - 4(1H)-one, methylhydrazone.

*Example 3*

A mixture of 4.2 g. of 3-cyclopropylpyrazolo[3,4-a]inden-4(1H)-one, made as in Example 1, and 1.0 g. of unsymmetrical dimethylhydrazine in 100 ml. of ethanol is heated at reflux for 12 hours. The solution is cooled and filtered to give the desired 4-dimethylhydrazone.

*Example 4*

A mixture of 19.4 g. of dimethylphthalate, 5.7 g. of sodium methoxide, 10.8 g. of cyclobutyl methyl ketone and 100 ml. of benzene is reacted as in Example 1 to give the solid 2-cyclobutylcarbonyl-1,3-indandione.

Heating 2.3 g. of the dione, 1.0 g. of hydrazine and 100 ml. of ethanol at reflux for 17 hours and cooling the solution separates 3-cyclobutylpyrazolo[3,4-a]inden-4(1H)-one, hydrazone.

*Example 5*

Twelve grams of 2-cyclopentylcarbonyl-1,3-indandione, prepared by the procedure of Example 1, and 1.6 g. of anhydrous hydrazine in 150 ml. of methanol is heated at reflux for 24 hours. The solution is cooled and diluted with 500 ml. of cold water. The resulting solid is 3-cyclopentylpyrazolo[3,4-a]inden-4(1H)-one.

A mixture of 2.4 g. of the indenone and 5.0 g. of hydrazine hydrate in 300 ml. of ethanol is refluxed for 48 hours. The solution is filtered to give 3-cyclopentylpyrazolo[3,4-a]inden-4(1H)-one, hydrazone.

*Example 6*

A mixture of 2.4 g. of 3-cyclopentylpyrazolo-[3,4-a]inden-4(1H)-one, made as in Example 5, 8.0 g. of unsymmetrical diethylhydrazine and 100 ml. of ethanol is refluxed for 24 hours. Cooling and filtering gives 3-cyclopentylpyrazolo[3,4 - a]inden-4(1H)-one, diethylhydrazone.

*Example 7*

A solution of 5.1 g. of 2-cyclohexylcarbonyl-1,3-indandione, M.P. 77° C., and 0.65 g. of hydrazine in 250 ml. of methanol is heated at reflux for 14 hours to give, after isolation as in Example 1, 3-cyclohexylpyrazolo[3,4-a]inden-4(1H)-one. The hydrazone derivative of this ketone is prepared by heating with one equivalent of hydrazine in ethanol for 24 hours.

*Example 8*

A solution of 5.4 g. of 2-cyclohexen-1-yl methyl ketone in 100 ml. of toluene is added dropwise to a mixture of 97 g. of dimethylphthalate, 28.5 g. of sodium methoxide and 150 ml. of toluene while azeotropically separating the methanol which forms. Cooling, filtering off the solid, dissolving it in water and acidifying with concentrated hydrochloric acid gives 2-(2-cyclohexen-1-ylcarbonyl)-1,3-indandione as an oil.

A mixture of 2.5 g. of the dione and 0.32 g. of anhydrous hydrazine are refluxed in 100 ml. of ethanol for 12 hours. Cooling and diluting with water separates 3 - (2-cyclohexen-1-yl)pyrazolo[3,4-a]inden-4(1H)-one. The ketone (1.0 g.) is heated at reflux with excess hydrazine in ethanol solution for 24 hours to give 3-(2-cyclohexen-1-yl)pyrazolo[3,4-a]inden-4(1H)-one, hydrazone.

*Example 9*

A mixture of 2.4 g. of 2-(1-cyclopenten-1-ylcarbonyl)-1,3-indandione, prepared by condensing diethyl phthalate with 1-cyclopenten-1-yl methyl ketone, and 1.5 g. of hydrazine hydrate in 200 ml. of methanol is heated at reflux for 48 hours. The resulting solid is 3-(1-cyclopenten-1-yl)pyrazolo[3,4-a]inden-4(1H)-one, hydrazone.

*Example 10*

A mixture of 2.5 g. of 2-(1,3-cyclohexadien-1-ylcarbonyl)-1,3-indandione, prepared by condensing 1,3-cyclohexadien-1-yl methyl ketone with dimethyl phthalate, and 0.5 g. of hydrazine hydrate in 150 ml. of ethanol is refluxed for 20 hours to give, after quenching with cold water, 3 - (1,3-cyclohexadienyl)-pyrazolo[3,4-a]inden-4(1H)-one. The ketone is heated at reflux with 1.0 g. of hydrazine hydrate and 100 ml. of ethanol for 20 hours to give, upon cooling and filtering, 3-(1,3-cyclohexadien - 1-yl)pyrazolo[3,4-a]inden-4(1H)-one, hydrazone.

*Example 11*

Hydrazine hydrate (0.5 g.) and 2.4 g. of 2-(3-methylcyclobutylcarbonyl)-1,3-indandione, prepared by condensing dimethyl phthalate with methyl 3-methylcyclobutyl ketone as in Example 8, are heated at reflux in 150 ml. of ethanol for 12 hours. Quenching with water gives the solid 3-(3-methylcyclobutyl)pyrazolo[3,4-a]inden-4-(1H)-one.

A mixture of this ketone, 0.7 g. of hydrazine hydrate and 100 ml. of ethanol is refluxed for 15 hours to give the corresponding hydrazone derivative.

*Example 12*

A mixture of 26.8 g. of 2-(4-methylcyclohexylcarbonyl)-1,3-indandione, prepared by condensing diethyl phthalate with methyl 4-methylcyclohexyl ketone, and 1.5 g. of hydrazine in 150 ml. of ethanol is heated at reflux for 72 hours. Cooling and filtering the solid gives 3 - (4 - methylcyclohexyl)pyrazolo[3,4-a]inden-4(1H)-one, hydrazone.

*Example 13*

Hydrazine hydrate (0.5 g.) and 2.8 g. of 2-(2-ethyl-2-cyclohexen-1-ylcarbonyl)-1,3-indandione, made by condensing 2-ethyl-2-cyclohexen-1-yl methyl ketone with dimethyl phthalate as in Example 8, in 125 ml. of ethanol are refluxed for 12 hours to give 3-(2-ethyl-2-cyclohexen-1-yl)pyrazolo[3,4-a]inden-4(1H)-one.

This compound (1.0 g.) is reacted with 0.5 g. of hydrazine in ethanol for 16 hours to give the 4-hydrazone.

The keto compound (1.0 g.) is reacted with 0.8 g. of unsymmetrical dimethylhydrazine in 100 ml. of ethanol at reflux for 8 hours to give the 3-(2-ethyl-2-cyclohexen-1-yl)pyrazolo[3,4-a]inden-4(1H)-one, dimethylhydrazone.

*Example 14*

A mixture of 2.5 g. of 2-(3-methyl-1-cyclopenten-1-ylcarbonyl) - 1,3 - indandione, made by condensing 3-methyl-1-cyclopenten-1-yl methyl ketone and dimethyl phthalate, and 1.2 g. of anhydrous hydrazine in 100 ml. of ethanol is heated at reflux for 48 hours. The solid which separates is 3-(3-methyl-1-cyclopenten-1-yl)-pyrazolo[3,4-a]inden-4(1H)-one, hydrazone.

*Example 15*

A solution of 5.0 g. of 5-chloro-2-cyclopropylcarbonyl-1,3-indandione (prepared by sodium methoxide condensation of dimethyl 4-chlorophthalate and cyclopropyl methyl ketone) in 200 ml. of ethanol and 0.7 g. of hydrazine are refluxed for 24 hours. Cooling, diluting with water and filtering yields a mixture of isomers, 6 - chloro-3-cyclopropylpyrazolo[3,4-a]inden-4(1H)-one and 7-chloro-3-cyclopropylpyrazolo[3,4-a]inden-4(1H)-one. Refluxing these ketones with excess hydrazine in ethanol solution forms the respective hydrazone derivatives which are separated by fractional crystallization from ethanol.

*Example 16*

A mixture of 1.5 g. of 6-chloro-(and 7-chloro)-3-cyclopropylpyrazolo[3,4-a]inden-4(1H)-one, made as in Example 15, and 1.0 g. of phenylhydrazine in 150 ml. of ethanol is heated at reflux for 48 hours. Cooling separates monochloro - 3 - cyclopropylpyrazolo[3,4-a]inden-4(1H)-one, phenylhydrazones which are separated by fractional crystallization from ethanol to give the 6-chloro and 7-chloro derivatives.

*Example 17*

A mixture of 3.2 g. of 5-bromo-2-cyclopentylcarbonyl-1,3-indandione (prepared by condensation of dimethyl 4-bromophthalate with cyclopentyl methyl ketone), 0.5 g. of hydrazine hydrate and 200 ml. of ethanol is heated at reflux for 16 hours. The solution is quenched to yield a mixture of 6-bromo-3-cyclopentylpyrazolo-[3,4-a]inden-4(1H)-one and 7-bromo-3-cyclopentylpyrazolo-[3,4-a]-inden-4(1H)-one. These crude ketones are reacted with an excess of hydrazine to give the corresponding hydrazones.

*Example 18*

A mixture of 3.9 g. of 4,5,6,7-tetrachloro-2-cyclohexylcarbonyl-1,3-indandione, prepared by the sodium methoxide condensation of dimethyl tetrachlorophthalate with cyclohexyl methyl ketone, and 0.5 g. of hydrazine hydrate in 100 ml. of ethanol is refluxed for 24 hours. Cooling, diluting with water and filtering gives the solid 5,6,7,8 - tetrachloro - 3 - cyclohexylpyrazolo - [3,4 - a]-inden-4(1H)-one.

The ketone (2.0 g.) is heated with 1.0 g. of hydrazine in ethanol to give the 4-hydrazone derivative.

*Example 19*

Hydrazine (0.5 g.) and 2.4 g. of 2-cyclopropylcarbonyl-5,6-dimethyl-1,3-indandione, prepared by condensing dimethyl 4,5-dimethylphthalate with cyclopropyl methyl ketone, are reacted as in Example 17 to give 3-cyclopropyl-6,7-dimethylpyrazolo[3,4-a]inden-4(1H)-one.

A mixture of 1.2 g. of the above prepared ketone, 0.2 g. of hydrazine and 100 ml. of methanol is heated at reflux for 48 hours. Cooling separates 3-cyclopropyl-6,7-dimethylpyrazolo[3,4-a]inden-4(1H)-one, hydrazone.

A mixture of 1.0 g. of 3-cyclopropyl-6,7-dimethylpyrazolo[3,4-a]inden-4(1H)-one is converted to the potassium salt by heating with 50 ml. of 5% potassium hydroxide. The resulting potassium salt (0.8 g.) is refluxed with 4 ml. of propionyl chloride in ether solution to give, upon concentration of the solution, 3-cyclopropyl - 6,7 - dimethyl - 1 - propionylpyrazolo[3,4 - a]inden-4(1H)-one. Reaction of this ketone with excess hydrazine in ethanol gives the hydrazone derivative.

*Example 20*

Condensation of dimethyl 3-ethoxy-4-methoxyphthalate with cyclopropyl methyl ketone in toluene solution containing sodium methoxide as in Example 1 gives 2-cyclopropylcarbonyl - 4 - ethoxy - 5 - methoxy - 1,3 - indandione.

A mixture of 2.9 g. of the indandione, 1.5 g. of hydrazine and 200 ml. of ethanol is heated at reflux for 72 hours. Cooling and filtration of the reaction mixture gives a mixture of 3-cyclopropyl-5-ethoxy-6-methoxypyrazolo[3,4-a]inden-4(1H)-one, hydrazone and 3-cyclopropyl - 8 - ethoxy - 7 - methoxypyrazolo[3,4 - a]inden-4(1H)-one, hydrazone.

*Example 21*

A mixture of 6.8 g. of 4-bromo-2-cyclopropylcarbonyl-5-hydroxy-6-methoxy-1,3-idandione (prepared by condensing dimethyl 3-bromo-4-acetoxy-5-methoxyphthalate with cyclopropyl methyl ketone), 0.7 g. of hydrazine and 300 ml. of ethanol is refluxed for 24 hours to give, after cooling, diluting with water and filtering, a mixture of 5 - bromo - 3 - cyclopropyl - 6 - hydroxy - 7 - methoxypyrazolo[3,4-a]inden-4(1H)-one and 8-bromo-3-cyclopropyl - 7 - hydroxy - 6 - methoxypyrazolo[3,4-a]inden-4(1H)-one. The hydrazone derivatives of these ketones are prepared by heating with one equivalent of hydrazine in ethanol for 24 hours.

*Example 22*

A mixture of 5.2 g. of 2-cyclopropylcarbonyl-5-nitro-1,3-indandione, prepared by condensation of dimethyl 4-nitrophthalate with cyclopropyl methyl ketone, and 1.0 g. of hydrazine hydrate in 300 ml. of ethanol is heated at reflux for 16 hours to form a mixture of 3-cyclopropyl-6-nitropyrazolo[3,4-a]inden-4(1H)-one and 3-cyclopropyl - 7 - nitropyrazolo[3,4 - a]inden-4(1H) - one. These ketones are heated at reflux with excess hydrazine in methanol solution to give the corresponding hydrazones.

*Example 23*

A mixture of 2.5 g. of 3-cyclopropyl-6-nitropyrazolo-

[3,4-a]inden-4(1H)-one, prepared as in Example 22, in 10 ml. of pyridine and a solution of 5.1 g. of sodium hydrosulfite in 30 ml. of water is heated at reflux for 30 minutes. The mixture is quenched and extracted to give the solid 6-amino-3-cyclopropylpyrazolo[3,4-a]inden-4-(1H)-one. This ketone is dissolved in 100 ml. of ethanol and refluxed with 0.6 g. of hydrazine hydrate for 12 hours to form the 4-hydrazone.

*Example 24*

Five grams of 3-cyclopropylpyrazolo[3,4-a]inden-4(1H)-one (made as in Example 1) is heated with 100 ml. of 5% potassium hydroxide. The potassium salt is reacted with 10 ml. of acetyl chloride in ether suspension to give 1-acetyl-3-cyclopropylpyrazolo[3,4-a]inden-4(1H)-one. This ketone (1.5 g.) is reacted with 0.5 g. of hydrazine in methanol by refluxing for 8 hours to give 1 - acetyl - 3 - cyclopropylpyrazolo[3,4 - a]inden - 4(1H) - one, hydrazone.

Similarly the potassium salt prepared above is reacted with an excess of phenethyl chloride in ethanol to form 3 - cyclopropyl - 1 - phenethylpyrazolo - [3,4-a]inden-4-(1H)-one. Reaction of this ketone with hydrazine by refluxing in ethanol for 10 hours yields 3-cyclopropyl-1-phenethylpyrazolo[3,4-a]inden-4(1H)-one, hydrazone.

*Example 25*

A solution of 1.0 g. of 3-cyclopropylpyrazolo-[3,4-a]inden-4(1H)-one, made as in Example 1, in 150 ml. of ether-tetrahydrofuran is reacted with an equivalent amount of potassium amide. The potassium salt is filtered off and reacted with an excess of benzyl chloride in ethanol to form 1-benzyl-3-cyclopropylpyrazolo[3,4-a]inden-4(1H)-one.

Reaction of the above prepared ketone with excess hydrazine furnishes the corresponding hydrazone.

*Example 26*

A mixture of 2.5 g. of 3-cyclopropylpyrazolo[3,4-a]-inden-4(1H)-one, made as in Example 1, and 75 ml. of 10% aqueous sodium hydroxide is warmed very briefly, then concentrated to a small volume. The sodium salt is isolated by filtration. A mixture of 1.5 g. of this salt and 5.0 g. of methyl iodide in 25 ml. of ethanol is heated at reflux for 5 hours. The volatiles are removed to leave 3-cyclopropyl - 1 - methylpyrazolo[3,4-a]inden-4(1H)-one. This ketone is heated with 1.0 g. of hydrazine in 100 ml. of methanol for 48 hours to separate the 4-hydrazone of the 1-methyl compound.

Similarly the sodium salt (1.0 g.) prepared above is reacted with 8.0 g. of butyl bromide in ethanol solution to give 1-butyl-3-cyclopropylpyrazolo[3,4-a]inden-(1H)-one. This compound is reacted with an excess of hydrazine (1.0 g.) in ethanol at reflux for 48 hours to give 1-butyl - 3 - cyclopropylpyrazolo[3,4-a]inden-4(1H)-one, hydrazone.

*Example 27*

A mixture of 5.0 g. of 3-cyclopropylpyrazolo[3,4-a]-inden-4(1H)-one, prepared as in Example 1, and 250 ml. of 10% aqueous sodium hydroxide is heated at 80° C. for 3 minutes. The sodium salt separates.

A mixture of 1.0 g. of the sodium salt and 2.5 g. of benzoyl chloride in 25 ml. of benzene is heated at reflux for 10 minutes. Evaporation of the volatile material leaves, as the residue, 1-benzoyl-3-cyclopropylpyrazolo-[3,4-a]inden-4(1H)-one. Treatment of this ketone with excess hydrazine gives the corresponding hydrazone.

*Example 28*

A mixture of 3.5 g. of 3-cyclohexylpyrazolo[3,4-]-inden-4(1H)-one, prepared as in Example 7, and 100 ml. of 10% aqueous sodium hydroxide is warmed for 3 minutes. The sodium salt is separated by filtration. A mixture of 0.5 g. of the sodium salt and 1 ml. of ethyl chloroformate in 10 ml. of ethanol is heated at reflux for 15 minutes. The volatiles are removed to leave 1-carbethoxy-3-cyclohexylpyrazolo[3,4-a]inden-4(1H)-one. A mixture of this ketone, 0.5 g. of hydrazine and 100 ml. of ethanol is refluxed for 16 hours. The solution is filtered to give 1-carbethoxy-3-cyclohexylpyrazolo[3,4-a]-inden-4(1H)-one, hydrazone.

In similar fashion, a mixture of 0.5 g. of the sodium salt prepared above and 0.4 g. of methyl chloroformate in 25 ml. of ether is refluxed for 15 minutes and concentrated to give 1-carbomethoxy-3-cyclohexylpyrazolo[3,4-a]inden-4(1H)-one. This crude ketone is reacted with an excess of ethylhydrazine in ethanol to separate the corresponding ethylhydrazone.

*Example 29*

A mixture of 1.0 g. of the sodium salt of 3-cyclopropylpyrazolo[3,4-a]inden-4(1H)-one, prepared as in Example 27, 0.8 g. of benzenesulfonyl chloride and 30 ml. of ether is refluxed for 10 minutes. Evaporation of the reaction mixture leaves, as the residue, 1-benzenesulfonyl-3-cyclopropylpyrazolo[3,4-a]inden - 4(1H)-one. Reaction of this ketone with excess hydrazine in ethanol gives the 4-hydrazone.

*Example 30*

A mixture of 2.9 g. of 2-(3-cyclohexen-1-yl-carbonyl)-4-ethyl-1,3-indandione, made as in Example 8 by condensing dimethyl 3-ethylphthalate with 3-cyclohexen-1-yl methyl ketone in toluene solution with sodium ethoxide, and 0.9 g. of hydrazine are heated at reflux in 300 ml. of ethanol for 64 hours. Cooling separates a mixture of isomers, 3-(3-cyclohexen-1-yl)-5-ethylpyrazolo[3,4-a]-inden-4(1H)-one, hydrazone and 3-(3-cyclohexen-1-yl)-8-ethylpyrazolo[3,4-a]inden-4(1H)-one, hydrazone.

*Example 31*

A mixture of 3.4 g. of 2-cyclopropylcarbonyl-5-iodo-1,3-indandione, prepared by condensation of cyclopropyl methyl ketone with dimethyl 4-iodophthalate, and 0.5 g. of hydrazine hydrate is heated at reflux with 200 ml. of ethanol for 24 hours. Cooling, adding water, filtering and recrystallizing the resulting solid from aqueous ethanol gives a mixture of 3-cyclopropyl-6-iodopyrazolo[3,4-a]inden-4(1H)-one and the corresponding 7-iodo compound. These ketones are reacted with an excess of hydrazine as in Example 1 to give the hydrazones.

*Example 32*

A mixture of 2.4 g. of 2-cyclopropylcarbonyl-4-methoxy-1,3-indandione, prepared as in Example 1 by condensing cyclopropyl methyl ketone with dimethyl 3-methoxyphthalate, and 0.8 g. of hydrazine in 200 ml. of ethanol is refluxed for 48 hours. Cooling separates a mixture of isomers, 3-cyclopropyl-8-methoxypyrazolo-[3,4-a]inden-4(1H)-one, hydrazone and 3-cyclopropyl-5-methoxypyrazolo[3,4-a]inden-4(1H)-one, hydrazone.

*Example 33*

A mixture of 3.0 g. of 2-cyclopentylcarbonyl-4,7-dimethoxy-1,3-indandione, prepared by the condensation of dimethyl 3,6-dimethoxyphthalate with cyclopentyl methyl ketone, 0.5 g. of hydrazine hydrate and 150 ml. of ethanol is refluxed for 16 hours to form 3-cyclopentyl-5,8-dimethoxypyrazolo[3,4-a]inden-4(1H)-one. This ketone is refluxed with 0.5 g. of hydrazine in ethanol for 20 hours to give, after cooling and filtering, 3-cyclopentyl-5,8-dimethoxypyrazolo[3,4-a]inden - 4(1H)-one, hydrazone.

*Example 34*

A mixture of molar equivalent quantities of dimethyl 4-acetoxyphthalate and cyclopropyl methyl ketone in benzene with sodium hydride condensing agent is reacted and worked up as in Example 1 to give 5-acetoxy-2-cyclopropylcarbonyl-1,3-indandione. This dione is slurried with 15% aqueous hydrochloric acid to remove the O-acetyl group. Recrystallization of the resulting solid from aqueous ethanol gives 2-cyclopropylcarbonyl-5-hydroxy-1,3-indandione.

A mixture of 2.0 g. of the hydroxyindandione prepared above and 0.8 g. of hydrazine in 150 ml. of benzene is heated at reflux for 36 hours. Cooling separates a mixture of 3-cyclopropyl-6-hydroxypyrazolo-[3,4-a]inden-4(1H)-one, hydrazone and 3-cyclopropyl-7-hydroxypyrazolo[3,4-a]inden-4(1H)-one, hydrazone.

This application is a continuation-in-part of copending application Serial No. 790,823, filed February 3, 1959.

What is claimed is:

1. A chemical compound having the following formula:

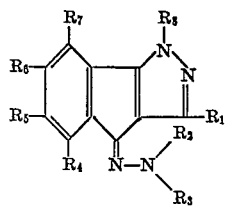

in which $R_1$ is a member selected from the group consisting of cycloalkyl, methylcycloalkyl, ethylcycloalkyl, cycloalkenyl, methylcycloalkenyl and ethylcycloalkenyl said cycloalkyl moiety having 3 to 6 carbon atoms and said cycloalkenyl moiety having 4 to 6 carbon atoms; $R_2$ and $R_3$ are members selected from the group consisting of hydrogen, lower alkyl and, when taken together with the nitrogen to which they are attached, monophenylamino; $R_4$ is a member selected from the group consisting of hydrogen and halogen; $R_5$ and $R_6$ are members selected from the group consisting of hydrogen, hydroxy, lower alkyl, amino, halogen, lower alkoxy and nitro; $R_7$ is a member selected from the group consisting of hydrogen and the halogen of a tetrahalogenated carbocyclic ring and $R_8$ is a member selected from the group consisting of hydrogen, alkyl having 1 to 4 carbon atoms, benzyl, phenethyl, benzenesulfonyl, benzoyl, acetyl, propionyl, carbethoxy and carbomethoxy.

2. A chemical compound having the following formula:

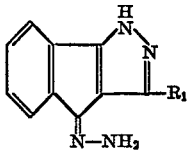

in which $R_1$ is cycloalkyl having 3 to 6 carbon atoms.

3. 3-cyclopropylpyrazolo[3,4-a]inden-4(1H)-one, hydrazone.

4. 3-cyclobutylpyrazolo[3,4-a]inden-4(1H)-one, hydrazone.

5. 3-cyclopentylpyrazolo[3,4-a]inden-4(1H)-one, hydrazone.

6. A chemical compound having the following formula:

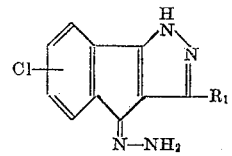

in which $R_1$ is cycloalkyl having 3 to 6 carbon atoms.

7. 6-chloro-3-cyclopropylpyrazolo[3,4-a]inden-4(1H)-one, hydrazone.

8. A chemical compound having the following formula:

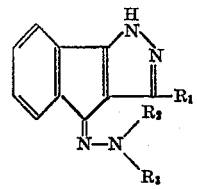

in which $R_1$ is cycloalkyl having 3 to 6 carbon atoms and $R_2$ and $R_3$ are lower alkyl.

9. 3-cyclopropylpyrazolo[3,4-a]inden-4(1H)-one, methylhydrazone.

10. A chemical compound having the following formula:

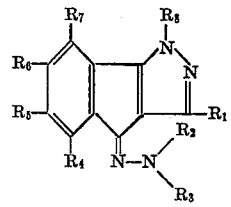

in which $R_1$ is a member selected from the group consisting of cycloalkyl, methylcycloalkyl, ethylcycloalkyl, cycloalkenyl, methylcycloalkenyl and ethylcycloalkenyl, said cycloalkyl moiety having 3 to 6 carbon atoms and said cycloalkenyl moiety having 4 to 6 carbon atoms; $R_4$ is a member selected from the group consisting of hydrogen and halogen; $R_5$ and $R_6$ are members selected from the group consisting of hydrogen, hydroxy, lower alkyl, amino, halogen, lower alkoxy and nitro; $R_7$ is a member selected from the group consisting of hydrogen and the halogen of a tetrahalogenated carbocyclic ring and $R_8$ is a member selected from the group consisting of hydrogen, alkyl having 1 to 4 carbon atoms, benzyl, phenethyl, benzenesulfonyl, benzoyl, acetyl, propionyl, carbethoxy and carbomethoxy.

11. A chemical compound having the following formula:

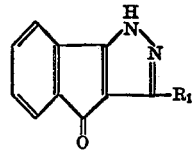

in which $R_1$ is cycloalkyl having 3 to 6 carbon atoms.

References Cited in the file of this patent

Fieser et al.: J. Am. Chem. Soc., vol. 73, pp. 681-684 (1951).